(12) United States Patent
Ashayer-Soltani et al.

(10) Patent No.: US 10,508,387 B2
(45) Date of Patent: Dec. 17, 2019

(54) CONDUCTIVE FIBRES (71) Applicant: NPL Management Limited, Teddington, Middlesex (GB)

(72) Inventors: Roya Ashayer-Soltani, Teddington (GB); Christopher Paul Hunt, Teddington (GB)

(73) Assignee: PIRETA LIMITED, Birmingham (GB)

( * ) Notice: Subject to any disclaimer, the term of this patent is extended or adjusted under 35 U.S.C. 154(b) by 821 days.

(21) Appl. No.: 14/770,272

(22) PCT Filed: Feb. 24, 2014

(86) PCT No.: PCT/GB2014/050550
§ 371 (c)(1),
(2) Date: Aug. 25, 2015

(87) PCT Pub. No.: WO2014/128505
PCT Pub. Date: Aug. 28, 2014

(65) Prior Publication Data
US 2016/0010273 A1 Jan. 14, 2016

(30) Foreign Application Priority Data
Feb. 25, 2013 (GB) .................................. 1303284.2

(51) Int. Cl.
| | |
|---|---|
| *D06M 11/83* | (2006.01) |
| *B82Y 30/00* | (2011.01) |
| *D06M 11/155* | (2006.01) |
| *D06M 15/285* | (2006.01) |
| *D06M 15/356* | (2006.01) |
| *D06M 16/00* | (2006.01) |
| *C23C 18/16* | (2006.01) |
| *C23C 18/20* | (2006.01) |
| *C23C 18/30* | (2006.01) |
| *C23C 18/40* | (2006.01) |
| *C23C 18/44* | (2006.01) |
| *D01C 1/00* | (2006.01) |
| *D06M 15/21* | (2006.01) |
| *H01B 1/02* | (2006.01) |
| *D06M 101/06* | (2006.01) |

(52) U.S. Cl.
CPC ............. *D06M 11/83* (2013.01); *B82Y 30/00* (2013.01); *C23C 18/165* (2013.01); *C23C 18/166* (2013.01); *C23C 18/1641* (2013.01); *C23C 18/1651* (2013.01); *C23C 18/1692* (2013.01); *C23C 18/2086* (2013.01); *C23C 18/30* (2013.01); *C23C 18/40* (2013.01); *C23C 18/44* (2013.01); *D01C 1/00* (2013.01); *D06M 11/155* (2013.01); *D06M 15/21* (2013.01); *D06M 15/285* (2013.01); *D06M 15/356* (2013.01); *D06M 16/00* (2013.01); *H01B 1/02* (2013.01); *H01B 1/026* (2013.01); *D06M 2101/06* (2013.01); *D10B 2201/02* (2013.01); *D10B 2401/16* (2013.01)

(58) Field of Classification Search
CPC .. D06M 11/83; D06M 11/155; D06M 15/285; D06M 15/356; D06M 15/21; D06M 16/00; B82Y 30/00; C23C 18/1651; C23C 18/166; C23C 18/2086; C23C 18/30; C23C 18/40; C23C 18/1692; C23C 18/1641; C23C 18/165; C23C 18/44; D01C 1/00; H01B 1/02; H01B 1/026
See application file for complete search history.

(56) References Cited

U.S. PATENT DOCUMENTS

| | | | | |
|---|---|---|---|---|
| 2005/0214480 A1* | 9/2005 | Garbar | ..................... | C09D 5/24 428/1.1 |
| 2007/0054577 A1* | 3/2007 | Avloni | ................ | D06M 10/025 442/110 |
| 2009/0136719 A1* | 5/2009 | Kawamura | ............... | B32B 3/14 428/195.1 |
| 2015/0176198 A1* | 6/2015 | Strickland | .............. | B82Y 40/00 442/193 |

FOREIGN PATENT DOCUMENTS

| | | | | |
|---|---|---|---|---|
| WO | 2004068389 A2 | 8/2004 | | |
| WO | WO 2004/068389 | * | 8/2004 | |
| WO | 2006104279 | 10/2006 | | |
| WO | WO 2009/129410 | * | 10/2009 | ............ D06M 11/83 |

OTHER PUBLICATIONS

International Search Report & Written Opinion dated May 6, 2014.

\* cited by examiner

*Primary Examiner* — Amina S Khan
(74) *Attorney, Agent, or Firm* — Thomas | Horstemeyer, LLP (57) ABSTRACT

A method for making a fiber electrically conductive comprises the steps of: (a) providing a fiber having a negative electric charge at the surface of the fiber, (b) applying to the fiber a substance (such as a polyelectrolyte) which provides a layer of said substance on the fiber and changes the electric charge at the surface of the fiber from negative to positive, wherein said substance is not chitosan, and (c) making the surface of the fiber electrically conductive with a metal, wherein the metal of step (c) is provided in the form of metal ions and wherein a reducing agent (for example) is employed to reduce the metal ions to elemental metal. Fabrics formed from conductive fibers are also provided.

18 Claims, 8 Drawing Sheets

CONDUCTIVE FIBRES

CROSS-REFERENCE TO RELATED APPLICATION

This application is the 35 U.S.C. § 371 national stage of, and claims priority to and the benefit of, PCT application PCT/GB2014/050550, filed Feb. 24, 2014, which claims priority to and the benefit of GB Application No. 1303284.2, filed on Feb. 25, 2013, herein incorporated by reference in their entireties.

TECHNICAL FIELD

The present invention relates to a method for making an electrically conductive fibre for a fabric, to fabric formed from a plurality of such fibres, and to items incorporating said fabric. In particular, it relates to the coating of a natural fibre such as cotton with silver nanoparticles. The resultant cotton fabric exhibits full silver particle coverage with a good adhesion to the fibres. As well as being conductive and extremely flexible, the fabric is also antibacterial due to the presence of nanosilver.

BACKGROUND ART

There have been a number of attempts to make conductive fabric so that conductive clothing or luggage and the like can be produced into which can be incorporated electronic equipment such as smartphones, GPS devices and personal computers. Such devices have various uses in the consumer, business and military fields.

Traditional methods for making conductive fabrics rely on the inclusion of a conductive filament into the body of the fabric when the fabric is woven.

The first conductive fabric was made of silk organza where the conductive fibre was made of a silk thread wrapped in thin copper foil (E. R. Post and M. Orth, IEEE International Symposium on Wearable Computers, Oct. 13-14, 1997).

Co-weaving of metal wires or conductive polymer filaments within the fabric has also been used (H.-C. Chen, K.-C. Lee and J.-H. Lin, Composites, Part A, 35, 1249-1256, 2004). However, it is difficult to form anything other than the simplest designs from these processes.

Another way of making conductive fabrics is by using conductive polymers. Conductive polymers are widely used for textile coating, including polyaniline and polypyrrole (J. Molina, A. I. del Rio, J. Bonastre and F. Cases, Eur. Polym. J., 45, 1302, 2009 and B. Yue, C. Wang, X. Ding and G. G. Wallace, Electrochim. Acta, 68, 18-24, 2012). However, these polymers do not tend to be as conductive as metals.

A nylon fabric coated in silver is sold under the Shieldex trade mark by Shieldex Trading, Inc. This product uses thick silver and is expensive, and is not offered in a form to make circuits.

WO 2008/133672 (Drexel University) discloses a method of grafting multi-walled nanotubes onto the outer surface of a polyacrylonitrile nanofibre by using a polyelectrolyte as a linker group. No example of any other grafting method is given.

US 2007/0054577 (Avloni) discloses the formation of electroconductive fibres by means of (i) plasma pretreatment followed by (ii) layer-by-layer attachment of a conductive coating using a polyelectrolyte as a linker group.

CN 102120043 (Basic Medical) discloses the attachment of a nanosilver layer to a gauze by using chitosan as a linker in order to impart biocidal properties to the gauze.

WO 00/49219 (Foxwood Research Limited) also discloses a method of coating a substrate with biocidal nanosilver by using chitosan as a linker group to bind the silver particles to the substrate. The chitosan needs to be crosslinked in order to render it insoluble at acidic pH.

SUMMARY OF THE PRESENT INVENTION

In a first aspect of the present invention, there is provided a method for making a fibre electrically conductive, comprising the steps of:
(a) providing a fibre having a negative electric charge at the surface of the fibre,
(b) applying to the fibre a substance (referred to below as a 'linker') which provides a layer of said substance on the fibre and changes the electric charge at the surface of the fibre from negative to positive, wherein said substance is not chitosan, and
(c) making the surface of the fibre electrically conductive with a metal, wherein the metal of step (c) is provided in the form of metal ions and wherein the metal ions are reduced to elemental metal.

It has been discovered that the use of chitosan disadvantageously affects the physical properties of the fibre, and chitosan is therefore excluded from the scope of the present method.

The advantage of providing the metal in the form of metal ions and then carrying out a reduction is that improved results are obtained (see Comparative Example 5).

The reducing agent is preferably applied to the surface of the fibre first and the metal ions are applied to the surface of the fibre second. The advantage of this method is that it minimises the amount of reducing agent and the metal ion solutions that need to be used, and secondly results in a faster coverage of fibres with nanoparticles.

In an alternative embodiment, a solution of metal ions, a reducing agent and the linker are combined first (for example in aqueous solution) and then the combination is applied to the fibre. Although in this method the metal ions have been reduced before being applied to the fibre, they have also been in contact with the linker before contacting the fibre. This method differs from a method in which elemental metal is applied to a fibre to which the linker has already been applied (compare Example 4 and Comparative Example 5 below). Without wishing to be constrained by theory, it is thought that the presence of the linker prevents the nanoparticles from agglomerating, which would otherwise lead to poor results.

Preferably, the amount of reducing agent used is less than 7 mg (most preferably 6.1 mg) in 98 ml of water. The advantage of this appears to be that the resulting metal particles are unusually small—preferably less than 50 nm and most preferably about 20 nm in average diameter. This means that the metal particles can then be self-sintered by applying a gentle heat—for example, silver nanoparticles of about 20 nm in average diameter can be self-sintered at about 60° C. to result in a uniform conductive silver sheath around the fibre.

A further metal layer may then be applied to the conductive fibre by e.g. a conventional electroless plating technique.

Preferably, the method additionally comprises after step (a) the step of (a1) treating the fibre (preferably with an alkali solution, although an acidic solution may also be used) in order to increase the negative electric charge at the surface of the fibre (a so-called "mercerisation" step).

The fibre in question may be natural, synthetic, woven or non-woven. Preferably it is a natural fibre and may already be woven into a fabric. Alternatively, it may be provided in unwoven form and woven after being treated in accordance with the method.

Natural fibres (and particularly cellulosic fibres such as cotton) have a natural negative charge at the fibre surface, which means that metal particles (which form electrostatic bonds to net positive charges) do not bond to the fibre surface.

The substance of step (b) is preferably a cationic polyelectrolyte, and more preferably protamine sulfate, polybrene, poly(L-lysine), poly(allylamine hydrochloride), poly(ethylene glycol-co-dimethylaminoethyl methacrylate), poly(ethyleneimine), polyacrylamide, poly(acrylamide-co-diallyldimethylammoniumchloride), diallyldimethylammonium chloride, poly(diallyldimethylammonium chloride), poly[bis(2-chloroethyl) ether-alt-1,3-bis[3-(dimethylamino)propyl]urea] quaternized, polyquaternium-7, or any combination thereof.

Poly(allylamine hydrochloride) is commercially available with two different molecular weights, namely: 1) average Mw of about 15,000 and 2) average Mw of about 58,000. Either can be used.

The amount of the substance of step (b) is preferably not more than 2 wt %, preferably not more than 1 wt %, and most preferably about 0.2 wt % (specifically, 1 g of a 20 wt % solution of PDADMAC mixed with 100 ml water, or 0.198 wt %).

In a particularly preferred embodiment, it is poly(diallyldimethylammonium chloride), otherwise known as PDADMAC (image courtesy of Sigma-Aldrich):

PDADMAC plays an important role as a binder between the metal and the textile resulting in a more uniform compact coating. It is thought that the presence of two methyl groups and an amine group in the polymer chain provides electrically positive sites at which nucleation can occur. The attachment of PDADMAC to the fibre is believed to be predominantly determined by the ionic interaction between the cationic PDADMAC and anionic surface of the fibre. Owing to its cationic nature, the attachment of PDADMAC to cotton fibres is believed to be through ionic bonding. Long polymer chains can also provide more cationic sites for possibly stronger binding to the fabric surface.

PDADMAC is commercially available in four versions, which differ as to their molecular weight:
(i) very low molecular weight (average Mw<100,000)
(ii) low molecular weight (average Mw 100,000-200,000)
(iii) medium molecular weight (average Mw 200,000-350,000)
(iv) high molecular weight (average Mw 400,000-500,000)

Although any of these (or a combination) can be used in the present invention, (ii) low molecular weight PDADMAC is preferred. Commercially, this is provided in a 20 wt % solution in water.

Step (a1) is a well-known technique known as mercerisation. In conventional mercerisation, the concentration of alkali solution is 10 wt % or more. In the present invention, however, it is preferred to use alkali solution at about 1 wt %.

When the fibres are treated with alkali solution (such as sodium hydroxide solution), the number of anionic sites on the fibre surface increases, which facilitates better adsorption of PDADMAC.

Sodium hydroxide causes some separation of the cellulose chains in the fabric, hence increasing the number of negative sites for bonding. Therefore, it can be expected that by increasing the percentage weight of NaOH in the solution, the number of negative sites will also increase. However, above 3.0 moldm$^{-3}$ of alkali treatment, the fibre's properties seem to change. Accordingly, in a preferred embodiment the concentration of alkali solution is less than this.

It should be noted that other types of alkali solutions are expected to behave in a similar manner. Alkali treatment of a cellulose based material is called mercerization. However, surface charges of other types of fabric can be increased using different treatments.

The fibre can then be woven into a fabric (or into a conductive pattern within an otherwise non-conductive fabric). Equally, the method in accordance with the invention can be employed to coat fibres within a fabric with a conductive coating.

The nanosilver coated fabric can be used in a wide range of applications such as wound dressings, hygienic clothing and medical applications where the presence of bacteria is hazardous. For example, it can be used for the fabrication of face masks, surgical gloves and military uniforms where the infection of a wound could have a severe effect. The high flexibility of fabric textiles allows them to be employed in the health, leisure and sports industries.

The conductive fabric can also be used as a wearable sensor, which feels comfortable and non-restrictive.

In the inventive process, the fabrication of nanoparticles preferably occurs simultaneously by (1) wetting the fabric with the reducing solution and (2) adding the metal salt solution which results in nanoparticle formation and their deposition on the fibres. This is an important conceptual advantage in that the nanoparticle deposition does not need the immersion of the whole fabric in the solution containing nanoparticles. This method of nanometal deposition is more cost effective than the traditional method. In addition, this method can be adapted to deposit the silver selectively. This could be by screen or spray printing onto the fabric for any type of circuit design including complex patterns.

Other types of polymers for coating the fabric prior to deposition of nanoparticles could be used. Polymers could have charges and be used solely or in combination. In addition, the process can be used for coverage of cotton textiles with other types of nanoparticles that offer different properties such as copper, titanium dioxide and zinc.

Different types of nanoparticles/nanowires prior to electroless plating could be used. Electroless plating can be achieved by other types of materials such as Al, Ni and Sn, depending on the application.

A further development of this process could include spray coating.

In a second aspect of the invention, there is provided a method for making a fibre electrically conductive, comprising the steps of:
(i) providing a fibre having a negative electric charge at the surface of the fibre,
(ii) treating the fibre with an alkali solution in order to increase the negative electric charge at the surface of the fibre,
(iii) applying to the fibre of step (ii) a substance which provides a layer of said substance around the fibre and changes the electric charge at the surface of the fibre from negative to positive,
(iv) depositing metal onto the surface of the fibre of step (iii) in order to make the surface electrically conductive.

In a third aspect of the invention, there is provided a method for depositing metal onto the surface of a fibre having a positive charge at the surface of the fibre, comprising applying a reducing agent (such as aqueous sodium borohydride) to the surface of the fibre first and applying metal ions (such as silver nitrate) to the surface of the fibre second, whereby the metal ions are reduced to metal particles (preferably with an average size of less than 50 nm, most preferably with an average size of about 20 nm).

Preferably, the amount of reducing agent used is less than 7 mg (most preferably 6.1 mg) in 98 ml of water.

BRIEF DESCRIPTION OF THE DRAWINGS

A number of preferred embodiments of the invention will now be described, with reference to the accompanying drawings, in which.

EXAMPLE 1

Figure 4:
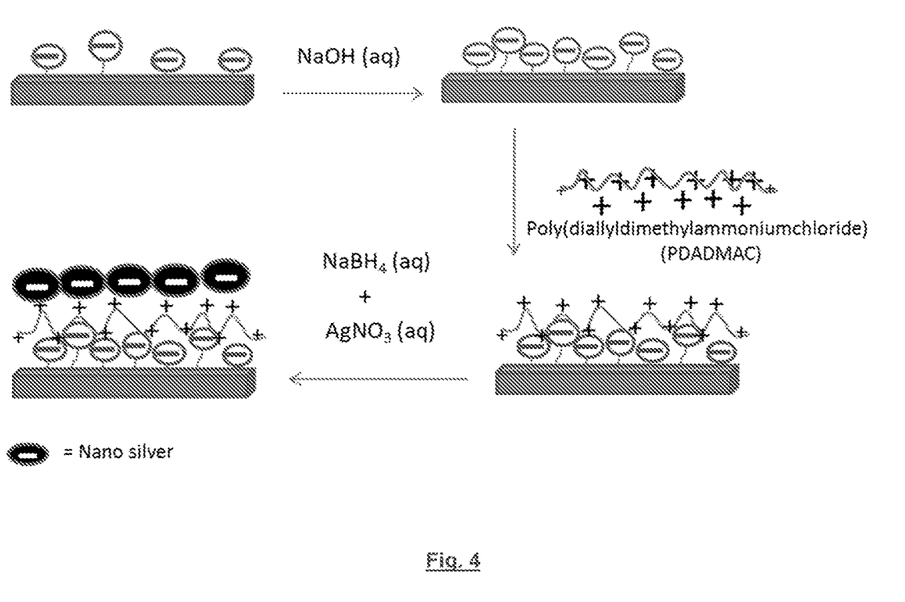
FIG. 4 is a schematic diagram showing the steps of a preferred method in accordance with the present invention.

Cotton fabric was treated by means of the following four stage process:
1. Mercerization
2. Surface modification
3. Fabrication and deposition and sintering of silver nanoparticles
4. Secondary conductive layer build-up A schematic diagram illustrating this Example is shown in FIG. 4.

1. Mercerization

Cotton fabric was treated with 1 wt %. aqueous NaOH solution at room temperature for 30 minutes followed by rinsing with distilled water.

2. Surface Modification

The sample was dried and then its fibres were coated with a 0.198 wt % aqueous solution of poly-diallyldimethylammonium chloride (PDADMAC). This was made up by taking 1 g of a 20 wt % solution of PDADMAC and mixing that with 100 ml of water, so that the resulting solution was 0.2 g of PDADMAC in 101 ml water, i.e. 0.198 wt %.

After thoroughly wetting the fabric with the solution, the fabric was dried at 59° C. in the oven for 5 minutes in order to evaporate any remaining water molecules. It should be noted that the fabric can be dried naturally at room temperature prior to nanoparticle deposition.

3. Fabrication and Deposition

An aqueous solution of 0.025 M (0.43 g/100 ml water) of silver nitrate was prepared. Next, the cotton fabric (1.5 g with surface area of 64 mm$^2$) was wetted with 0.1 ml of $1.61\times10^{-4}$ M (6.1 mg/98 ml water) of an aqueous solution of NaBH$_4$. Then 10 µl of the silver nitrate solution was added to the fabric.

The colour of the fabric immediately changed from white to brownish colour, which is an indication of the formation of nanosilver particles. The size of the nanoparticles was verified by dynamic light scattering (DLS) to be approximately 20 nm. The textile was dried at 59° C. and then another reduction step was carried out in order to add another layer of nanoparticles to the fabric. The cotton fibres were fully covered with silver nanoparticles after three consecutive reductions.

4. Secondary Conductive Layer Buildup

A conductive silver sheath with a thickness less than 100 nm was established on the fibres, and then electroless metal plating was employed to thicken the conductive layer. Specifically, copper electroless plating was carried out at a temperature of 46° C. for 25 minutes. With a copper thickness of approximately 1.25 microns, the resistivity was 0.1 Ω/sq.

Figure 1:
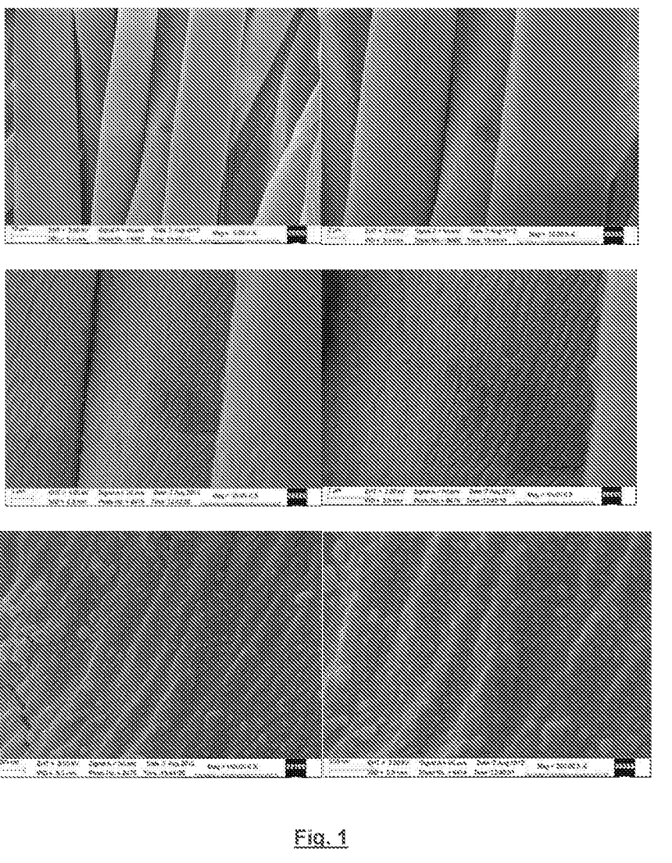
FIG. 1 shows a series of scanning electron microscope (SEM) images (3× reduction) of cotton fabric treated by means of a method according to the invention.

A series of SEMs of the resulting treated cotton fibres are shown in FIG. 1.

Figure 2:
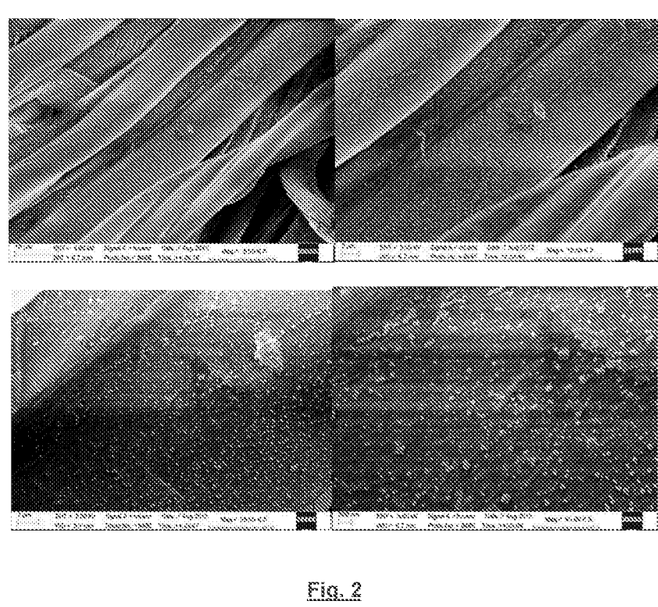
FIG. 2 shows a series of SEM images (3× reduction) of cotton fabric treated by means of a method according to the invention except with the mercerisation step being omitted.

As a control, an identical cotton fabric is subjected to the method but with the mercerization step being omitted. During the subsequent process steps, the fibres were not fully covered with nano-silver particles (see FIG. 2). The mercerization process creates many more negative sites on the fibres, and without this step the opportunity for bonding in the subsequent steps is reduced.

A further control is carried out by subjecting an identical cotton fabric to the method but without using any PDADMAC.

Figure 3:
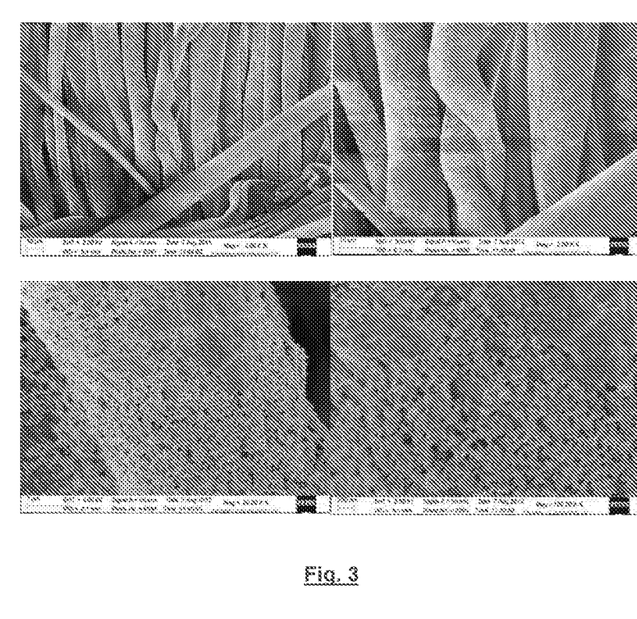
FIG. 3 shows a series of SEM images (3× reduction) of cotton fabric treated by means of a method according to the invention except that the step of applying a cationic polyelectrolyte has been omitted.

PDADMAC plays an important role as a binder between the silver particles and textile resulting in a more uniform compact coating (FIG. 1). By contrast, the textile prepared with the mercerisation step but without PDADMAC had a random irregular morphology (FIG. 3).

EXAMPLE 2

In order to make the second sample of conductive fabric the steps of Example 1 above were repeated except that the fabric was coated with an aqueous solution of poly(acrylamide-co-diallyldimethylammoniumchloride) (PAADADMAC) instead of PDADMAC.

The polymeric solution was made up by taking 1 g of a 10 wt % solution of PAADADMAC and mixing that with 100 ml of water.

Figure 5:
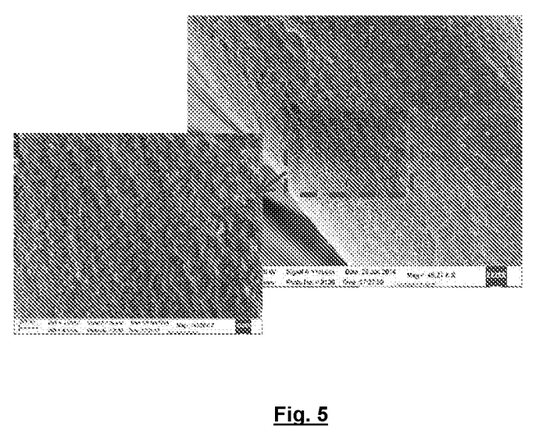
FIG. 5 shows an SEM image (and an enlarged version) of another cotton fabric treated by means of a method according to the invention.

SEM images (FIG. 5) showed full coverage of fibres within the fabric. Copper Electroless plating was carried out at a temperature of 46° C. for 25 minutes. This resulted in a copper thickness of approximately 1.25 microns with a resistivity of 0.2 Ω/sq.

EXAMPLE 3

Example 1 was repeated but with a different cationic polyelectrolyte, namely poly(allylamine hydrochloride) (PAAHC) with a molecular weight of 58000, purchased from Sigma Aldrich.

The polymeric solution was made up by making 1 wt % aqueous solution of PAAHC.

Figure 6:
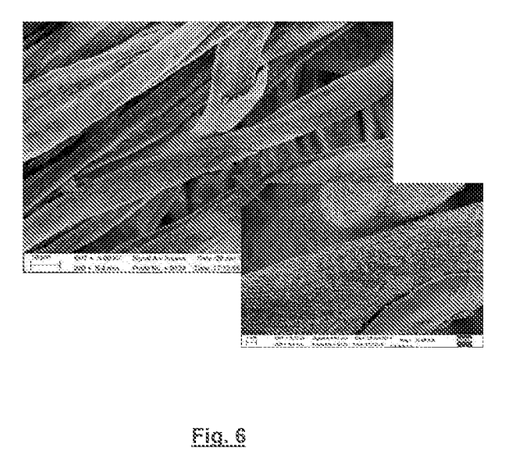
FIG. 6 shows an SEM image (and an enlarged version) of another cotton fabric treated by means of a method according to the invention.

SEM images (FIG. 6) showed coverage of fibres within the fabric. Copper Electroless plating was carried out at a temperature of 46° C. for 25 minutes. This resulted in a copper thickness of approximately 1.25 microns, the resistivity was 0.2 Ω/sq.

EXAMPLE 4

Figure 7:
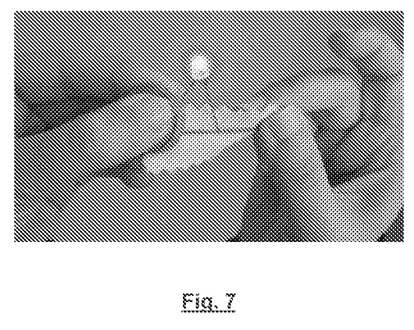
FIG. 7 is a photograph showing (in use) a conductive track made by means of a method according to the invention.

An experiment was conducted to investigate the addition of polyelectrolyte to the nanoparticle solution prior to the deposition of nanoparticles on the fabric. The following steps were carried out:
(a) 1 ml of a solution of 0.025 M of silver nitrate was added to 100 ml of $1.61 \times 10^{-4}$ M $NaBH_4$ solution. The colour immediately changed to a yellow toned colour, due to the formation of silver nanoparticles.
(b) An aqueous solution of poly-diallyldimethylammonium chloride (PDADMAC) was made up by taking 1 g of a 20 wt % solution of PDADMAC and mixing that with 100 ml of water, so that the resulting solution was 0.2 g of PDADMAC in 101 ml water, i.e. 0.198 wt %.
(c) 0.1 ml of the PDADMAC solution prepared in step (b) was added to the silver nanoparticle solution. The colour changed from yellow to a red toned colour. The solution was then centrifuged at 3500 rpm for 100 minutes. The effluent was discharged and the precipitation was used for coating the fabric after which the textile was dried at 60° C. prior to copper electroless plating. This method enabled a very fine conductive track to be created. One such track has been shown in FIG. 7.

It should be noted that when the polyelectrolyte was added to the nanoparticle solution, the zeta potential of the solution changed from negative to positive (+36). Also, after centrifuging, the particles were not agglomerated and did not form large silver metal particles. Without wishing to be constrained by theory, it is thought that this is due to the bonding between the nanosilver particles and the charge groups on the polymer chain. Therefore, when positioned on the fabric it was adsorbed by the fabric evenly.

COMPARATIVE EXAMPLE 5

Figure 8A:
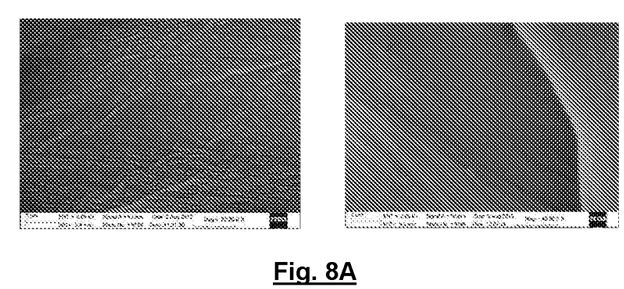
FIG. 8A shows SEM images of cotton fibres immersed in nanosilver solution (not in accordance with the invention)

An experiment was conducted to investigate the effectiveness of nanosilver particles solution for making the conductive fabric. The fibres within the fabric were coated with the PDADMAC linker. The nanosilver solution was prepared approximately 2 hours prior to the application. It was observed that the fabric was not coated with nanosilver particles even after eight consecutive deposition of nanosilver particle solution. SEM images of cotton fibres immersed in nanosilver solution are shown in FIG. 8A.

Figure 8B:
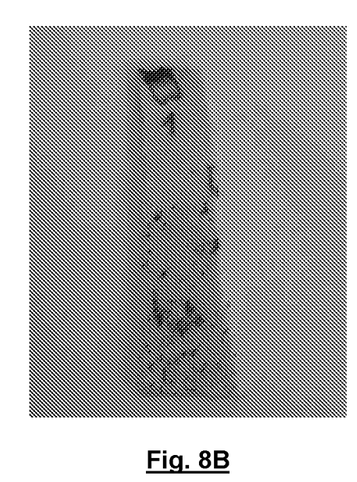
FIG. 8B is a photograph of the cotton fabric of FIG. 8A after eletroless plating with copper.

In addition, when copper electroless plating was carried out at a temperature of 46° C. for more than 3 hours, the fabric was not covered with copper (see FIG. 8B). This not surprising as there was poor nanosilver coverage.

COMPARATIVE EXAMPLE 6

In order to make a sample of conductive fabric the same steps as those previously mentioned (see Example 1) were used. However, the only change made to the process was that the fabric was coated with an aqueous solution of 1% w chitosan (purchased from Sigma Aldrich).

It should be noted that Chitosan does not dissolve in water; therefore an aqueous solution of (1 gram of chitosan in 98 ml of deionised water and 2 ml of acetic acid) was made.

The resultant conductive fabric has lost its stretchablity and the surface was quite grainy and rough. The resistance was equal to the resistance of the fabric of Example 1.

Since the texture of the textile had been altered so much, it was decided to explore using a diluted chitosan solution. However a similar effect was observed when chitosan solution was diluted to 0.1% w.

The invention claimed is:

1. A method for making a fibre electrically conductive, comprising the steps of:
(a) providing a fibre having a negative electric charge at the surface of the fibre,
(b) applying to the fibre a substance (referred to below as a 'linker') which provides a layer of said substance on the fibre and changes the electric charge at the surface of the fibre from negative to positive, wherein said substance is not chitosan, wherein said substance is a cationic polyelectrolyte,
(c) making the surface of the fibre electrically conductive with a metal,
wherein the metal of step (c) is provided in the form of metal cations and wherein the metal cations are reduced to elemental metal; and
(d) sintering the metal.

2. A method as claimed in claim 1, wherein a reducing agent is employed to reduce the metal ions to the elemental metal and wherein the reducing agent is applied to the surface of the fibre first and the metal ions are applied to the surface of the fibre second.

3. A method as claimed in claim 1, wherein a solution of metal ions, a reducing agent and said substance are combined and then the combination is applied to the fibre.

4. A method as claimed in claim 3, wherein the solution of metal ions and the reducing agent are combined first, and then said substance is added.

5. A method as claimed in claim 1, additionally comprising after step (a) the step of
(a1) treating the fibre with an alkali or acidic solution in order to increase the negative electric charge at the surface of the fibre.

6. A method as claimed in claim 5, wherein step (a1) comprises treating the fibre with a sodium hydroxide aqueous solution of concentration less than 3.0 $mol/dm^3$.

7. A method as claimed in claim 6, wherein the sodium hydroxide aqueous solution has a concentration of about 1 wt %.

8. A method as claimed in claim 1, wherein the substance of step (b) is selected from the group consisting of protamine sulfate, polybrene, poly(L-lysine), poly(allylamine hydrochloride), poly(ethylene glycol-co-dimethylaminoethyl methacrylate), poly(ethyleneimine), polyacrylamide, poly(acrylamide-co-diallyldimethylammoniumchloride), diallyldimethylammonium chloride, poly (diallyldimethylammonium chloride), poly[bis(2-chloroethyl) ether-alt-1,3-bis[3-(dimethylamino)propyl]urea] quaternized, polyquaternium-7, or any combination thereof.

9. A method as claimed in claim 8, wherein the substance of step (b) is an about 0.2 wt % aqueous solution of poly(diallyldimethylammonium chloride).

10. A method as claimed in claim 1, wherein said metal after reduction is in the form of metal particles having an average diameter less than 50 nm.

11. A method as claimed in claim 1, wherein sodium borohydride is employed to reduce the metal ions to the elemental metal.

12. A method as claimed in claim 1, wherein the metal ions are provided in the form of metal nitrate.

13. A method as claimed in claim 1, wherein the sintering step (d) takes place at a temperature from 50 to 70° C.

14. A method as claimed in claim 1, comprising the additional step of applying a further layer of metal to the metal on the fibre.

15. A method as claimed in claim 14, wherein said further layer of metal is applied by means of electroless plating.

16. A method as claimed in claim 15, wherein the metal in the further layer is different to the metal of step (c).

17. The method as claimed in claim 1, wherein sintering the metal particles comprises allowing the metal particles to self-sinter.

18. The method according to claim 1, wherein the resulting fibre comprises a linker layer and a metal layer, wherein the linker layer is between the surface of the fibre and the metal layer.

* * * * *